United States Patent [19] [11] 4,322,515
Aliev et al. [45] Mar. 30, 1982

[54] PROCESS FOR PREPARING POLYMERIC PETROLEUM RESINS

[76] Inventors: Sakhib M. O. Aliev, ulitsa Barinova, 12, kv. 31; Vagab S. Aliev, ulitsa Nizami, 66, blok 5, kv. 40; Tofik A. Gadzhiev, ulitsa Malygina, 17, kv. 16; Ali R. O. Ismailov, Chkalovsky pereulok, 7, kv. 8; Arif I. O. Gasanov, ulitsa Polukhina, 150, kv. 25; Vagif B. G. O. Guseinov, ulitsa Meskheti, 4, kv. 2, all of Baku, U.S.S.R.

[21] Appl. No.: 113,195

[22] Filed: Jan. 18, 1980

[51] Int. Cl.$^3$ .................... C08F 210/00; C08F 236/00
[52] U.S. Cl. ..................................... 526/213; 526/290
[58] Field of Search ................................ 526/213, 290

[56] References Cited
U.S. PATENT DOCUMENTS 4,169,821  10/1979  Werner et al. ..................... 526/290

OTHER PUBLICATIONS

"Study of Composition and Conversions of Products of High-Temperature Decay of Petroleum Hydrocarbons", R. Ismailov et al., Azerbaijan State Publishing House, Baku 1968, pp. 302-364, Inventor's Certificate No. 138,377.
"Synthetic Resins From Crude Oil", Aliev et al., Khimiya Publishers, Moscow-Leningrad, 1965, p. 89.

*Primary Examiner*—Harry Wong, Jr.
*Attorney, Agent, or Firm*—Fleit & Jacobson

[57] ABSTRACT

The process comprises polymerization of liquid pyrolyzates of petroleum hydrocarbons when heating them in the presence of an initiator containing an organic peroxide and a metal salt of an organic acid. Fractions having boiling point of 10° to 190° C. are used as liquid pyrolyzates of petrocarbons.

10 Claims, No Drawings

PROCESS FOR PREPARING POLYMERIC PETROLEUM RESINS

BACKGROUND OF THE INVENTION

1. Field of the Invention

The present invention relates to the process of preparing polymeric petroleum resins. It may prove the most advantageous in preparing paint materials, compositions intended for application as insulating coatings, and in the production of plastics and rubber compositions.

Though synthesis of resins from the crude oil is well-known in the art for a comparatively long time and has wide application in chemical industry, the problem of developing a low-cost technology providing for a high yield of highquality polymeric resins has kept its urgency up to now.

2. Description of the Prior Art

Numerous attempts to solve this problem have been heretofore made by selecting polymerization initiators and process conditions but success achieved in one direction (e.g. an increase in the yield of the end product) was accompanied, as a rule, by deterioration of other process variables and resin properties (e.g. a decrease in solubility, an increase in brittleness etc.). In particular, there are known methods of preparing petroleum resins providing for thermal or catalytic initiation of polymerization.

Another process of preparing resins from petroleum products by polymerization of pyrolyzates of unsaturated hydrocarbons when heating (thermal initiation) proceeds at a low speed and is characterized by a comparatively low yield of the end product (see e.g. V. S. Aliev, N. B. Altman "Sinteticheskie smoly iz neftyanogo syrya", "Khimiya" Publishers, M., 1965, p. 89). To speed up the polymerization under thermal initiation, an increase in temperature up to 250° to 280° C. is needed which leads to sharp deterioration in quality of the resin obtained, i.e. molecular weight decreases, resinifying occurs resulting in dark resins due to the presence in the final product of dimers, trimers, codimers, cotrimers, cyclodienes and aryl alkenes, all being hard to separate. Resins thus obtained have a strong and unpleasant smell. For this reason only the process of thermal polymerization of the styrene-containing fraction (boiling point of 140° to 200° C.) of liquid pyrolyzates has commercial application though this application is rather limited. In practicing this process the yield of resin does not exceed 6%, calculated as starting liquid pyrolyzates, and polystyrene resins obtained are characterized by an increased brittleness, do not dissolve in a nontoxic solvent (white spirit) and need to be plastified.

Also known is a process of polymerization of liquid pyrolyzates, using initiators. In accordance with this process, when polymerizing narrow and wide alkenyl aromatic fractions boiling away at a temperature above 100° C., organic peroxides are used as an initiator (see R. G. Ismailov, G. M. Mamedaliev, S. M. Aliev "Issledovanie sostava i prevrashchenia produktov vysokotemperaturnogo raspada uglevodorodov nefti", 1968, pp. 302–364).

Application of initiators, as compared with the thermal polymerization, allows the process to be carried out at moderate temperatures (80° to 140° C.), the yield of resins to be increased 1.5 to 2-fold and at the same time the molecular weight of resins to be increased up to 15000 to 30000; it also allows the coloration of resins to be sharply improved. However, the resins thus obtained are characterized by such disadvantages as low solubility in non-toxic aliphatic solvents, increased brittleness, necessity of plastification. Moreover, disability of the oxidative polymerization in thin layers and low compatibility with vegetable oils limit the possibility of application of these resins in the coating industry as a film-forming material.

In polymerization of diene-cyclodiene-containing fractions of pyrolysis the above-described processes make it possible to obtain resins consisting mainly of dimers, trimers, codimers, cotrimers, dienes and cyclodienes, which possess such disadvantages as dark colour, high brittleness, strong and unpleasant smell, disability to dry in coatings.

Due to said disadvantages, these resins have not found application in the coating industry. Catalytic polymerization of unsaturated fractions of liquid pyrolyzates in the presence of a Friedel-Craft catalyst (metal halides and complexes thereof), and hydrogen fluoride, boron trifluoride, hydrochloric acid, phosphoric acid etc. has been studied in detail.

The process of producing petroleum resins by polymerization of alkenyl aromatic or diene-olefine fractions of liquid pyrolyzates have been commercially practiced. The catalytic polymerization of unsaturated fractions of pyrolysis is carried out at relatively high temperatures (20° to 120° C.); the yield of resins is as a rule higher as compared with that in the processes of both the initiated and thermal polymerization procedures, which can be explained by participation in the polymerization reaction of not only alkenyl aromatic and diene monomers but also olefines contained in the raw material.

However, the processes of the catalytic polymerization of fractions of liquid pyrolyzates in the presence of the Friedel-Craft catalysts have many serious disadvantages among which in the first place are the following:

the need of thorough drying the raw material;

corrosion of the equipment;

formation of contaminated waste water which is difficult to purify;

formation of a stable emulsion at the stage of neutralization and washing-up, decomposition of which emulsion is connected with great difficulties;

low quality of the resins obtained: dark colour, unpleasant smell, a very low molecular weight (up to 100), brittleness and poor drying ability of the coatings based on these resins, increased ash-content and acidity, unsatisfactory water and chemical resistance.

Thus, the processes of catalytic polymerization of unsaturated fractions of liquid pyrolyzates are characterized by that the process is complicated and the resins obtained are of a low quality.

Resins obtained by the catalytic polymerization of alkenylaromatic fractions do not dissolve in nontoxic aliphatic solvents as well as in the case of initiated and thermal polymerization processes.

Resins which are soluble in the aliphatic solvents can be prepared from diene-olefine fractions using a more complicated procedure providing either preliminary separation of cyclodienes from the raw material or application of special nitrogen- and oxygen-containing additives to the Friedel-Craft catalyst, these procedures resulting in higher contamination of waste waters and making purification thereof more difficult. Resins thus obtained contain dimers, trimers, codimers, contrimers which give these resins and coatings based thereupon an unpleasant smell and toxicity. The coatings based on said resins are characterized by an extremely low weather resistance.

It is believed that the most promising is the process for preparing polymeric petroleum resins, which process comprises polymerization of liquid pyrolyzates of petroleum hydrocarbons when heated in the presence of an initiator and subsequent separation of the end product (see USSR Inventor's Certificate No. 138,377, Int.Cl.² (CO8F 240/00). According to this process, fractions having boiling point of 110° to 190° C. are used as liquid pyrolyzates of petroleum hydrocarbons. In the polymerization process a peroxide compound such as peroxide, hydroperoxide etc., for example cumene hydroperoxide, is used as an initiator. The petroleum resins being formed are copolymers of styrene, methyl styrenes and indene which are the end product. The end product is separated either by settling resins from polymerizate in heptane or in petroleum ester of by distillating nonpolymerized hydrocarbons with superheated water steam.

As compared with the above-described process, this procedure is more preferable because it does not need such temperatures as in thermal initiation; moreover, it is not accompanied by separation of large amounts of wastes as it occurs in the catalytic initiation. However, this process is not free of some essential disadvantages either. In particular, this process may be practiced but with fractions having boiling point of 110° to 190° C., which adversely effects the yield of the end product and the process profitability as a whole. To illustrate and confirm this disadvantage, it is sufficient to make a step-by-step investigation of the process of transforming starting petroleum products into a polymeric resin. The fraction having boiling point of lower than 110° C. is distilled from liquid pyrolyzates of crude oil followed by separation of the fraction having boiling point of 110° to 190° C. from the residue which separation is carried out by vacuum rectification. The yield of said fraction for liquid pyrolyzates of gases is 16 to 18% by weight; the same for liquid pyrolyzates of gasoline is 20 to 22% by weight, and for liquid pyrolyzates of kerosene-gas oil fractions said yield is 18 to 20% by weight. The fraction having boiling point of 110° to 190° C. contains 25 to 35% by weight of styrene and methyl styrenes, 20 to 35% by weight of indene and methyl indene, 30 to 50% by weight of ($C_8$–$C_9$) aromatic hydrocarbons. Dienes and cyclodienes are absent in said fraction. The yield of the petroleum resins is 20 to 30% by weight for the 110° to 190° C fraction, and 4 to 6.2% by weight for starting liquid pyrolyzates. The resins obtained by this process are characterized by an increased molecular weight (15000 to 40000), an increased softening point (130° to 140° C.), brittleness, low adhesion to various surfaces, low impact strength, unsatisfactory bending strength of coatings. These resins dissolve in toxic aromatic solvents or in mixtures containing aliphatic solvents. They do not dissolve in pure nontoxic aliphatic solvents. The resins obtained by the above described process cannot participate, like condensed vegetable oils do, in oxidative polymerization in thin layer; moreover, they are not compatible with condensed vegetable oils. Limited application of such resins in the composition of paint materials becomes possible after carrying out preliminary plastification with expensive plasticizers (dibutyl phthalate, chlorinated paraffin etc.). The above disadvantages are due to the monomeric composition of the raw material and to the application of only organic peroxides as an initiator. This results in obtaining an aryl alkene resin concentrated with styrene.

It is also important to note that the reaction mixture must be held for 70 to 120 hours during the polymerization process. Naturally, such a duration of the holding exerts an essentially limiting effect upon the output and makes the equipment used in practicing the process more complicated. Attempts to improve the above described procedure by increasing the temperature of the reaction mixture have not led to the desired results because a comparatively slight increase in reaction rate has demanded for an excessively high specific energy consumption. In addition, this procedure involves substantial complication of the processing equipment, a decrease in quality and in the yield of polymeric resins. Said factors in total raise doubts as to economic expediency of solving the existing contradiction by a simple change of the process conditions. The limited character of the source of raw materials (the possibility of using only fractions having boiling point of 110° to 190° C.) should be also attributed to the same totality of factors.

An object of the invention is an essential increase in reaction rate without a considerable increase in temperature by expanding the range of starting materials, and changing the polymerization initiator thus reducing the price of the process and that of the end product.

SUMMARY OF THE INVENTION

The main object of the present invention is to provide a process for preparing polymeric petroleum resins wherein a substantial increase in the reaction rate without any increase in specific energy consumption is achieved as compared with the prior art processes.

Another important object of the present invention is to provide a lower cost procedure for preparing polymeric petroleum resins which makes it possible to expand the range of starting materials.

A further object of the present invention is to improve quality and processing characteristics of the polymeric petroleum resins obtained.

Another object of the present invention is to provide a process for preparing polymeric petroleum resins, which allows an increase in the yield of the end product.

An additional object of the present invention is to improve performance characteristics of coatings and materials obtained on the basis of the polymeric petroleum resins as the end product.

A further object of the present invention is to provide a process making it possible to obtain polymeric petroleum resins which are compatible with condensed vegetable oils.

Another object of the present invention is to provide the possibility of obtaining polymeric petroleum resins readily soluble in nontoxic solvents.

These and other objects of the present invention are attained in that in the process for preparing polymeric petroleum resins, comprising polymerization of liquid pyrolyzates of petroleum hydrocarbons when heating them in the presence of an initiator containing at least one organic peroxide compound followed by separating the end product, according to the invention, fractions having boiling point of 10° to 190° C. are used as liquid pyrolyzates of petroleum hydrocarbons, and in polymerization process an initiator further containing at least one metal salt of an organic acid is used. Hereinafter the term "organic peroxide compound" is understood as organic peroxides, hydroperoxides, peroxide derivatives of carbonyl compounds, peresters, diacyl peroxides and peracids. Utilization of a metal salt or salts of organic acids in the initiator composition allows the range of starting materials to be substantially expanded (polymerization of fractions having boiling point of 10° to 190° C.) while polymerization time to be shortened more than 5-fold as compared with prior art processes without any increase in specific energy consumption,. The same factor promotes a substantial increase (2.5-fold) in the yield of the end product. When using the inventive procedure, the positive effect occurs already in the stage of separating the starting material due to a greater extent of utilization of oil products and to process simplification. In particular, fractions having boiling point of 10° to 190° C. are separated from liquid pyrolyzates by a single distillation. The yield of these fractions is about 90% by weight for liquid pyrolyzates of gasoline, 70 to 75% by weight for liquid pyrolyzates of gases, and 65 to 70% by weight for liquid pyrolyzates of kerosene-gas oil fractions.

The composition of the 10° to 190° C. fraction is 6.7% by weight diolefins, 2 to 4% by weight cyclodienes, 2 to 6% by weight monoolefins, 16 to 20% by weight aryl alkenes (styrene, indene and alkyl derivatives thereof), 66 to 71% by weight aromatic hydrocarbons, 0 to 33% by weight paraffins-naphthenes.

Petroleum resins obtained according to the present invention are characterized by a low molecular weight 1000 as compared with 15000 to 25000 of the prior art resins), low softening point (56° to 65° C. as compared with 130° to 140° C. of the prior art resins) thus simplifying the procedure of discharge, packing and dissolving the same resins in white spirit.

Due to the presence of reactive ethylene links, resins obtained by the inventive process, in contrast to those obtained according to the prior art process, possess good drying ability in thin films and form hard, elastic, shock, water and light resistant coatings having a good adhesive ability to metal, glass, wood, concrete etc.

It is expedient to use as an initiator a mixture of an organic peroxide compound and a metal salt of an organic acid, such as an organic carboxylic acid in a weight ratio of 1:1 to 19:1. Where the above ratio is utilized, the positive effect shows up most vividly.

Said polymerization initiator is preferably added to the reaction mixture in an amount of 0.2 to 2% by weight. Failure to utilize this parameter results in either deteriorating of the quality of resins and materials based thereon, or does not allow the advantages to be gained as compared to the prior art procedures.

An alkali metal salt, and/or an alkali-earth metal salt, and/or a salt of a metal with several common oxidation states of naphthenic acid, or a fatty acid, or an aromatic acid, or an unsaturated acid, or a mixture of said acids may be used as a metal salt of an organic acid.

It is desirable that an initiator used in the polymerization process further contain a mixture of alkali metal salts and salts of a metal with several common oxidation states.

A mixture of fractions having boiling point of 20° to 65° C. and fractions having boiling point of 130° to 190° C. is expedient to use as liquid pyrolyzates of petroleum hydrocarbons. In this case the yield of the end product is the highest.

Polymerization of said mixture of fractions is preferred with an initiator containing an organic peroxide compound and a metal salt of an organic acid in a weight ratio of 1:1 to 5:1.

An alternative modification of the process with fractions having boiling point of 130° to 190° C. used as liquid pyrolyzates of petroleum hydrocarbons is possible.

In polymerization of fractions having boiling point of 130° to 190° C. it is expedient to use an initiator containing an organic peroxide compound and a metal salt of an organic acid in a weight ratio of 10:1 to 19:1.

The present invention resides in that the process for preparing polymeric petroleum resins comprises polymerization of fractions of liquid pyrolyzates of petroleum hydrocarbons having boiling point of 10° to 190° C. which polymerization being carried out when heating said fraction in the presence of an initiator consisting of a mixture of at least one organic peroxide compound and at least one metal salt of an organic acid, subsequent separation of the end product.

DETAILED DESCRIPTION OF THE INVENTION

For the purpose of carrying out the inventive process for preparing polymeric petroleum resins, use is made of a conventional reaction chamber (autoclave) comprising a hollow sealed housing, a mixer and a heater. The mixer is constructed as a vertical shaft provided with vanes and connected to a drive adapted to impart rotary motion thereto. In a wide commercial utilization of the process it is expedient to use a conventional reactor of the column type to which a mixture of liquid pyrolyzates and an initiator is added. In the reactor of the column type the process of polymerization and separation of the end product is carried out continuously.

The process for preparing polymeric petroleum resins of the present invention is carried out as follows.

Liquid pyrolyzates of petroleum hydrocarbons, namely fractions having boiling point of 10° to 190° C. are used as a starting material. Said fractions are mixed with an initiator so that an amount of an initiator in the reaction mixture is 0.2 to 2% by weight. According to the present invention, a mixture of at least one organic peroxide compound and at least one metal salt of an organic acid is used as an initiator. The organic peroxide compound and the metal salt of an organic acid contained in the initiator are in a weight ratio of 1:1 to 19:1. Organic peroxides, hydroperoxides, peroxide derivatives of carbonyl compounds, peresters, diacyl peroxides, peracids and mixtures thereof are used as an organic peroxide compound. According to the present invention, an alkali metal salt, an alkali-earth metal salt, or a salt of a metal with several common oxidation states and salts of such organic acids as naphthenic, fatty, aromatic, unsaturated and mixtures thereof, are used as a metal salt of an organic acid.

According to one modification of the process, the initiator used in polymerization contains a mixture of an alkali metal salt and a salt of a metal with several common oxidation states.

The homogeneous reaction mixture is heated up to a temperature of 60° to 250° C. and is held at this temperature for 3 to 25 hours. During this holding liquid pyrolyzates get polymerized forming a polymeric petroleum resin. Non-polymerized hydrocarbons are separated by superheated steam distillation or by rectification followed by distillation in a film evaporator, or by settling resins when treating them with alcohols. The residual polymeric petroleum resin is the end product and may be applied in thermoreactive compositions in manufacture of reinforced and filled plastics, and as insulating and corrosion resistant coatings applied on backings made of various materials.

According to the preferred modification of the process, a mixture of fractions having boiling point of 20° to 65° C. and those having boiling point of 130° to 190° C. is used as a starting material. Under such conditions, polymerization is carried out in the presence of an initiator wherein an organic peroxide compound and a metal salt of an organic acid are in a weight ratio of 1:1 to 5:1.

According to another modification of the process, fractions having boiling point of 130° to 190° C. are used as a starting material. Under such conditions, polymerization is carried out in the presence of an initiator wherein an organic peroxide compound and a metal salt of an organic acid are in a weight ratio of 10:1 to 19:1.

Polymeric petroleum resins thus obtained were examined and molecular weight, softening point and colour according to the iodimetric scale were determined.

Method of Determining Colour according to the Iodimetric Scale

The method is based upon comparing colour of the material under test with that of comparison solutions of the iodimetric scale which is a set of ampules containing iodine solutions of various concentrations in the solution of potassium iodide.

To prepare comparison solutions of the iodimetric scale 0.25, 0.50, 1, 2, 3, 4, 5, 7, 10, 15, 20, 30, 40, 60, 80, 100, 130, 160, 200, 220, 250, 280, 300, 400, 500, 700, 800, 1100, 1400, 1600, 1800, 2000, 2400 mg. of iodine are weighed; then these weighed samples are dissolved in 100 ml of the 0.5 N solution of potassium iodide.

The comparison solutions thus prepared are poured (5 ml each) into clean dry ampules which are then soldered. The ampules are placed into a special box provided with sockets. The iodimetric scale numbers corresponding to the amount (in mg) of iodine in the 0.5 N solution of potassium iodide are marked on the ampules.

The material under test in an amount of 5 ml is poured into a clean dry test tube which test tube is then mounted upon a support between two ampules containing comparison solutions. Visual determination in the transmitted light against a background of milk glass shows to which ampule the colour of the material under test is corresponding most of all.

The colour of the material under test is evaluated by the amount (in mg) of iodine contained in 100 ml of comparison solution the colour of which is similar to that of the material under test. If this colour does not correspond to that of any of the comparison solutions, it is evaluated by two adjacent comparison solutions situated at both sides thereof.

The resin prepared according to the invention is readily soluble not only in toxic solvents but in such nontoxic solvents as white spirit, petroleum solvent and a mixture thereof as well.

White spirit (a gasoline solvent for coating industry) is a narrow easily boiling fraction of straight-run distillation gasoline.

| White spirit is of the following characterisics: | |
|---|---|
| density at 20° C., g/cm$^3$, up to | 0.795 |
| initial boiling point, °C., up to | 165 |
| volatilization rate (by xylol) | 3 to 4.5 |
| closed flash point, °C., not less than | 33 |
| content of aromatic hydrocarbons, %, up to | 16 |

The petroleum solvent is a mixture of aromatic hydrocarbons of benzene series obtained in pyrolysis of petroleum fractions. It is a colourless or a yellowish liquid which is transparent at 25°+5° C., free of any admixtures prone to be suspended or settled down, water droplets among them.

| | |
|---|---|
| density at 20° C., g/cm$^3$, not less than | 0.848 |
| volatilization rate by xylol, up to | 2 |
| open flash point, °C., not less than | 17 |

Relative viscosity of a 60% solution of a resin in white spirit is determined as follows.

Relative viscosity of freely flowing paint materials is assumed to be the time of continuous outflow (in sec.) of a certain amount of the material under test through the calibrated nozzle of the viscosimeter.

The viscosimeter is mounted by means of support setscrews in such a way that its top edge is in the horizontal position. A vessel of not less than 110 ml capacity is put under the viscosimeter nozzle. The nozzle opening is closed from below with a finger, the material under test is poured with excess into the viscosimeter to form a convex meniscus over the top edge thereof. Excessive material and air bubbles that have been formed are removed either with a glass plate or a glass stick by sliding them over the viscosimeter top edge in the horizontal direction. Then the nozzle opening is opened and a stop-watch is started simultaneously with appearance of the material under test pouring down out of the nozzle. At the moment when the material under test discontinues its flow for the first time, the stop-watch is stopped, and the time of outflow is calculated (the error should not exceed 0.2 sec.).

The value of relative viscosity x (in sec.) is assumed to be an average value of three parallel determinations of the outflow time of the material under test. This value is calculated from the formula:

$$x = t \cdot k,$$

where t is an average value of the outflow time of the material under test;

k is the correction factor of the viscosimeter.

Allowable deviations of a single determination of the outflow time from the average value should not exceed ±2.5%.

A 60% solution of the resin in white spirit was used as a coating for control specimens. The coating was examined and tested using the following procedures.

Method of Determining Time and Degree of Drying

A drying degree defines the surface state of a paint material applied to a plate at certain duration and temperature of drying, and testing conditions.

Drying duration and degree are determined at a temperature of 20°±2° C. and relative air humidity of 65±5%, on three parallel steel plates each sizing 70×150 mm, after natural or hot drying of the paint material layer applied thereto. Said plates are held in the horizontal position at a temperature of 20°±2° C. and relative air humidity of 65±5% in a room protected from dust, draught and direct sunlight; then the test is carried out.

The test consists in determining drying time of the paint material which is necessary for it to achieve drying degree 1 and 3.

| Drying degree 1 | Type of test 2 | Characteristics of drying degrees 3 |
|---|---|---|
| 1 | Pouring about 0.5 g of glass balls from a height of 10 to 13 cm | Balls are completely removed with a soft brush to keep the painted surface undamaged. |
| 3 | Load of 200 g (pressure of about 50 g/cm²) | Paper disk does not adhere to the coating and leaves no imprints on the coating surface subjected to loading |

The drying time to degree 1 is determined as follows.

Painted plates are held until no stickiness of the layer of paint material is felt when gently touching it with a finger. After that about 0.5 g of glass balls are poured from a height of approximately 10 to 13 cm to form a thin layer on a horizontally positioned plate. The balls are kept on the plate for 60±2 sec.; then the plate is inclined to an angle of about 20° and the balls are swept away with a soft brush. If the balls are removed easily and completely without causing any damage to the layer surface, the time corresponding to degree 1 is fixed.

The drying time to degree 3 is determined as follows.

A paper disk and a rubber one thereupon are both laid on the surface of the painted plate leaving a margin of 1 to 2 cm from the edges thereof. Weights having mass in accordance with the above table are placed in the center of the rubber disk for 60±2 sec. After holding said load on the coating surface, the weight and the rubber disk are removed, and the plate together with the paper disk are freely dropped edgewise onto a wooden surface from a height of 2 to 3 cm. If the paper disk does not adhere to the coating and the surface below this disk corresponds to characteristics given in the table, the time needed to reach drying degree 3 is fixed.

The time in minutes, hours or days needed for the paint material applied as a layer of a certain thickness to the plate under certain drying conditions to reach a certain drying degree is assumed to be the test result. In this case a necessary drying degree is considered to be achieved if not less than two out of three parallel determinations correspond to the characteristic of a given drying degree.

Method of Determining Coating Hardness by a Pendulum Tester

The method is based upon determining the ratio of the decay time of the oscillations of the pendulum mounted on the paint coating to the decay time of the same pendulum mounted on the plate of photographic glass.

Hardness of paint coatings is determined at temperatures from 20° to 200° C.

General requirements to the pendulum tester:
pendulum mass—120±1 g;
pendulum length measured from supporting point to the pointer end—500±1 mm;
diameter of the steel ball (point of support)—7.938 mm instrument dial should be marked in degrees with zero situated in the center thereof; points are marked to both sides from zero.

The test is conducted as follows. The paint material under test is applied to a plate of photographic glass. Prior to starting, the pendulum tester is checked for decay time of oscillations of the pendulum whose points of support are positioned on the photographic glass plate between 5° and 2°. The decay time of pendulum oscillations should be 440±6 sec. Determination of the decay time of pendulum oscillations is carried out at 20°±1° C. and relative air humidity not more than 70%.

Hardness value (x) in conventional units is calculated from the formula:

$$x = t/t_1,$$

where t is decay time of pendulum oscillations from 5° to 2° on the paint coating under test, sec.;

$t_1$ is decay time of pendulum oscillations from 5° to 2° on the photographic glass plate, sec.

A test result is an average value of two determinations differing in results by not more than 30%.

Method of Testing Coating by Bending

The method is based upon determining the minimum diameter of a rod which, when used for bending a painted metal plate thereon, does not cause any mechanical damage and detachment of the paint coating.

The device intended for carrying out bending test of the paint coating is a panel with 12 steel chromium-plated rods positioned thereon, 9 of these rods being stationary fixed while 3 rods (upper line) being removable for replacement by rods of a different diameter. The length of the test portion of each rod is 55 mm.

The test is carried out on three parallel specimens at 20°±2° C. and relative air humidity of 65±5%.

A plate of black polished tin having 0.25 to 0.31 mm thickness, 20 to 50 mm width and 100 to 150 mm length, is coated with the paint material which is applied with a brush in the direction of the plate length; then the material is dried.

The plate is laid upon the rod of the largest diameter so as to have the coating disposed outwardly and is progressively bent around the rod for 1 to 2 sec. to the angle of 180° while tightly pressing the plate against the rod. Then the coating is inspected at the bend through the magnifying glass for cracks and detachment. If there is no defect, the plate is bent each time in another place in succession from the rod of a larger diameter to that of a smaller diameter until the above defects (cracks or detachment visible through the magnifying glass under 4 to 10-fold magnification) are detected.

A test result is the minimum diameter of the rod (in mm) where the coating under test remained undamaged.

Defects of the paint coating, found at a distance of 3 to 5 mm from the edges are disregarded.

Method of Determining Impact Strength of Films

The method is based upon the deformation of the paint-coated metal plate from free fall of a load onto said plate.

The device used for determining impact strength of films comprises a frame with an anvil pressed thereto, two stands fastened together by a traverse, a striker with a ball, a guide tube with a freely dropping load of 1 kg mass, and a device for holding and dropping the load. The device for holding and dropping the load comprises a housing, a stopper, a stop screw, a button, and an indicating pointer. The load is freely movable inside the guide tube and may be fixed at any height by means of the stop screw. The guide tube is provided with a 0 to 50 cm scale with an absolute error of measurement being up to 1 cm for counting the height of the load.

The tests are carried out at 20°±2° C. and relative air humidity of 65±5%.

The plate with a material under test applied thereto is placed on the anvil under the striker so that the coating is directed upwardly. The part of the plate subjected to the impact should be positioned at a distance of not less than 20 mm from the plate edges or from the centers of other parts which have been subjected to the impact.

The load is lifted and fixed at a certain height by means of the stop screw. Then by pressing the button the load is released and falls freely onto the striker. The striker transmits the impact to the plate lying on the anvil. After the impact, the load is lifted, the plate is removed and subjected to inspection through a magnifying glass for cracks, crumpling and detachment.

If there are no defects, the test is repeated increasing the height of load by 2 to 10 cm until the film damage caused by the impact is detected. Repeated tests are carried out each time on a new portion of the plate. In this case the test is repeated not less than three times for each height.

Impact strength of the film is expressed in kg.cm which means maximum height in cm from which the load of 1 kg mass falls onto the platform at a normal acceleration due to gravity without causing any mechanical damages (cracks, crumpling and detachment).

A test result is an average value of three determinations carried out in succession on different portions of the specimen.

Allowable deviations from the average value should not exceed 1 kg.cm.

If this condition is not met the test is repeated on two more plates; in this case test results should coincide for not less than two parallel specimens.

Determining Adhesion by the Method of Latticed Notches

When determining adhesion by said method not less than five ruled parallel notches are cut through the coating under test and to the painted surface with a razor blade, at a distance of 1 to 2 mm therebetween. The same number of similar notches is cut in the perpendicular direction. This results in formation of a standard lattice on the coating, which lattice consists of squares having similar size of 1×1 mm for coatings of less than 60 μm thickness and of 2×2 mm for coatings of more than 60 μm thickness.

After the lattice has been marked on the coating, the latter is completely cleaned from detached film pieces, and coating adhesion is evaluated by the four-point scale.

| Evaluation in points | Description of paint coating surface after notching a lattice thereupon |
|---|---|
| 1 | Notch edges should be smooth; there should be no detached pieces of coating |
| 2 | Slight coating detachment in the form of spots along the notch lines or at the intersection points thereof (up to 5% of the surface from each lattice) |
| 3 | Coating detachment along the notch lines in the form of strips (up to 35% of the surface from each lattice) |
| 4 | Complete or partial coating detachment in the form of strips or squares along the notch lines (more than 35% of the surface from each lattice) |

Volume of settling is determined as follows. Oil is mixed with resin at a temperature of 20°±2° C., carefully stirred and poured into a measuring cylinder having 100 ml volume and provided with a ground plug. The cylinder containing the boiled oil is set at rest at 20°±2° C. for 24 hours; then the settling volume is measured in mm (the number of mm of the residue is the settling volume percentage).

Quality Determination of Water Resistance in Films

Two tin plates sizing 5×10 cm each are painted with a tested varnish or paint. Painted plates are placed in the horizontal position in the glazed cabinet at a temperature of 20°±2° C.

Having become dry the two plates are vertically suspended at ⅔ of the height thereof in a glass dish containing distilled water. The test is carried out at a temperature of 20° C.

In two hours after removing the plates from water and drying them in the air the inspection thereof is carried out and there is noted:
1. Presence of white mat spots.
2. Beginning of film damage (rash, bubbles, wrinkles, detachment etc.).

On the first day of testing inspection is carried out every other two hours.

Specific Examples of practicing the process of the invention are given below.

EXAMPLE 1

The polymeric petroleum resin was prepared according to the invention as follows. Liquid pyrolyzates of gasoline, namely fractions having boiling point of 10° to 160° C. were used as a starting material. Said fractions in an amount of 993 kg were mixed with 7 kg of the initiator containing 3.5 kg of cumyl hydroperoxide and 3.5 kg of calcium stearate. Thus the amount of the initiator in the reaction mixture was 0.7% by weight, while cumyl hydroperoxide and calcium stearate contained in the initiator were taken in a weight ratio of 1:1. The homogeneous mixture of liquid pyrolyzates and the initiator was heated up to a temperature of 160° C. and was held at this temperature for 15 hours. During this holding the gasoline pyrolyzates got polymerized forming a resin. Non-polymerized hydrocarbons were removed by a direct steam distillation. The residual polymeric petroleum resin was the end product of the process. The yield of the end product was 150 kg or 15% by weight of the amount of the starting material or 12.75% by weight calculated as liquid pyrolyzates of gasoline.

The resin thus obtained was of the following characteristics:

| | |
|---|---|
| molecular weight | 800 |

| | |
|---|---|
| softening point, °C | 80 |
| colour (according to the iodimetric scale) | 600 |

Apart from toxic solvents, the resin was readily soluble in such nontoxic solvents as white spirit, petroleum solvent or a mixture thereof. Viscosity of a 60% solution of the resin in white spirit was 40 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 8 |
| relative hardness of the coating in conventional units | 0.4 |
| bending strength of the coating, mm | 10 |
| impact strength of the coating, kg . cm (elasticity) | 40 |
| adhesion to the steel plate, points | 2 |
| settling, vol. % | no residue |
| water resistance of the coating | 24 hr without any changes |

The above data prove the exemplified modification of the process to allow the polymerization time to be cut 8-fold and the yield of the end product to be increased 2.3-fold as compared with the prior art process (see USSR Inventor's Certificate No. 138,377).

EXAMPLE 2

The polymeric petroleum resin was prepared according to the invention as follows. Liquid pyrolyzates of gasoline, namely fractions having boiling point of 130° to 190° C. were used as a starting material. Said fractions in an amount of 990 kg were mixed with 10 kg of the initiator containing 9.5 kg of cumyl hydroperoxide and 0.5 kg of calcium stearate. Thus the amount of the initiator in the reaction mixture was 1% by weight while cumyl hydroperoxide and calcium stearate contained in the initiator were taken in a weight ratio of 19:1. The homogeneous mixture of liquid pyrolyzates and the initiator was heated up to a temperature of 250° C. and was held at this temperature for 6 hours. During this holding the gasoline pyrolyzates got polymerized forming a resin. Non-polymerized hydrocarbons were removed by an atmospheric vacuum distillation. The residual polymeric petroleum resin was the end product of the process. The yield of the end product was 340 kg or 34% by weight of the amount of the starting material or 5.1% by weight calculated as liquid pyrolyzates of gasoline.

The resin thus obtained was of the following characteristics.

| | |
|---|---|
| molecular weight | 900 |
| softening point, °C. | 85 |
| colour (according to the iodimetric scale) | 200 |

Apart from toxic solvents, the resin was readily soluble in such nontoxic solvents as white spirit, petroleum solvent or a mixture thereof. Viscosity of a 60% solution of the resin in white spirit was 50 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 1 |
| up to degree 3 | 6 |
| relative hardness of the coating in conventional units | 0.5 |
| bending strength of the coating, mm | 5 |
| impact strength of the coating, kg . cm(elasticity) | 30 |
| adhesion to the steel plate, points | 3 |
| settling, vol. % | no residue |
| water resistance of the coating | 24 hr without any changes |

The above data prove the exemplified modification of the process to allow the polymerization time to be cut 18-fold as compared with the prior art process (see USSR Inventor's Certificate No. 138,377).

EXAMPLE 3

The polymeric petroleum resin was prepared according to the invention as follows. Liquid pyrolyzates of gasoline, namely fractions having boiling point of 20° to 65° C. and fractions having boiling point of 130° to 190° C. were used as a starting material and were taken in a weight ratio of 1:3. Said fractions in an amount of 994 kg were mixed with 6 kg of the initiator containing 5 kg of cumyl hydroperoxide and 1 kg of calcium stearate. Thus the amount of the initiator in the reaction mixture was 0.6% by weight, while cumyl hydroperoxide and calcium stearate contained in the initiator were taken in a weight ratio of 5:1. The homogeneous mixture of liquid pyrolyzates and the initiator was heated up to a temperature of 200° C. and was held at this temperature for 8 hours. During this holding the gasoline pyrolyzates got polymerized forming a resin. Non-polymerized hydrocarbons were removed by rectification followed by distillation thereof in a film evaporator. The residual polymeric petroleum resin was the end product of the process. The yield of the end product was 300 kg or 30% by weight of the amount of the starting material or 7.5% by weight calculated as liquid pyrolyzates of gasoline.

The resin thus obtained was of the following characteristics:

| | |
|---|---|
| molecular weight | 1000 |
| softening point, °C. | 75 |
| colour (according to the iodimetric scale) | 260 |

Apart from toxic solvents, the resin was readily soluble in such nontoxic solvents as white spirit, petroleum solvent or a mixture thereof. Viscosity of a 60% solution of the resin in white spirit was 55 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| drying time at 20° C., hr: | |
|---|---|
| up to degree 1 | 2 |
| up to degree 3 | 7 |
| relative hardness of the coating in conventional units | 0.4 |
| bending strength of the coating, mm | 5 |
| impact strength of the coating, kg . cm | 45 |
| adhesion to the steel plate, points | 2 |
| settling, vol. % | no residue |
| water resistance of the coating | 24 hr without any changes |

The above data prove the exemplified modification of the process to allow the polymerization time to the cut 12-fold and the yield of the end product to be increased 1.5-fold as compared with the prior art process (see USSR Inventor's Certificate No. 138,377).

EXAMPLE 4 (NEGATIVE)

The polymeric petroleum resin was prepared from liquid pyrolyzates of gasoline (fractions having boiling point of 0° to 160° C.) basically as described in Examples 1 through 3. The same initiator being the mixture of cumyl hydroperoxide and calcium stearate in a weight ratio therebetween of 5:1 was used. However, in contrast to the inventive process, fractions having boiling point of 0° to 160° C. were used as liquid pyrolyzates of gasoline. After heating the mixture up to 160° C. and holding at this temperature for 10 hours, a polymeric petroleum resin was obtained, said resin being the end product. The yield of the end product was 160 kg or 16% by weight of the amount of the starting material or 13.68% by weight calculated as liquid pyrolyzates of gasoline. The resin thus obtained was examined to determine characteristics thereof. The results appeared to be as follows:

| molecular weight | 600 |
|---|---|
| softening point, °C. | 60 |
| colour (according to the iodimetric scale) | 300 |

Apart from toxic solvents, the resin was readily soluble in such nontoxic solvents as white spirit, petroleum solvent and a mixture thereof. Viscosity of a 60% solution of the resin in white spirit was 25 sec. The viscosity was taken using the above described procedure. The 60% solution of the resin in white spirit was used for application of a coating to a metal and a glass plates. The coating was applied by immersing said plates into the resin solution. Similarly, coatings were applied to control specimens of the same materials. The coatings of the control specimens were examined and tested in accordance with the above described procedures. The results appeared to be as follows:

| drying time at 20° C., hr: | |
|---|---|
| up to degree 1 | 3 |
| up to degree 3 | 14 |
| relative hardness of the coating | 0.4 |
| bending strength of the coating, mm | 10 |
| impact strength of the coating, kg . cm | 40 |
| adhesion to the steel plate, points | 3 |
| settling, vol.% | no residue |
| water resistance of the coating | 24 hr without any changes |

The above data prove that failure to utilize the boiling away range of the starting fractions of the invention resulted in pressure increase in the reaction zone of the oligomerization due to the fact that because of a decrease in the initial point of boiling of the starting fraction of liquid pyrolyzates of gasoline, low-boiling monomers of the $C_4$ fraction such as butylene, butadiene etc. having a comparatively higher vapor elasticity than that of monomers of the $C_5$–$C_9$ fraction, are involved in the oligomerization reaction together with unsaturated hydrocarbons contained in the $C_5$–$C_9$ fraction.

EXAMPLE 5 (NEGATIVE)

The polymeric petroleum resin was prepared from liquid pyrolyzates of gasoline (fractions having boiling point of 10° to 235° C.) basically as described in Examples 1 through 3. The same initiator being the mixture of cumyl hydroperoxide and calcium stearate in a weight ratio therebetween of 5:1 was used. However, in contrast to the inventive process, fractions having boiling point of 10° to 235° C. were used as liquid pyrolyzates of gasoline. After heating the mixture up to a temperature of 160° C. and holding at this temperature for 14 hours, a polymeric petroleum resin was obtained, said resin being the end product. The yield of the end product was 70 kg or 7.0% by weight of the amount of the starting material or 6.5% by weight calculated as liquid pyrolyzates of gasoline. The resin thus obtained was examined to determine characteristics thereof. The results appeared to be as follows:

| molecular weight | 500 |
|---|---|
| softening point, °C. | 50 |
| colour (according to the iodimetric scale) | 800 |

Apart from toxic solvents, the resin was readily soluble in such nontoxic solvents as white spirit, petroleum solvent and a mixture thereof. Viscosity of a 60% solution of the resin in white spirit was 15 sec. The viscosity was taken using the above described procedure. The 60% solution of the resin in white spirit was used for application of a coating to a metal and a glass plates. The coating was applied by immersing said plates into the resin solution.

Similarly, coatings were applied to control specimens of the same materials. The coatings of the control specimens were examined and tested in accordance with the above described procedures. The results appeared to be as follows:

| drying time at 20° C., hr: | |
|---|---|
| up to degree 1 | 5 |
| up to degree 3 | 24 |
| relative hardness of the coating in conventional units | 0.15 |
| bending strength of the coating, mm | 25 |
| impact strength of the coating, kg . cm | 5 |
| adhesion to the steel plate, points | 4 |
| settling, vol. % | no residue |
| water resistance of the coating | 24 hr without any |

The above data prove that utilization of fractions of liquid pyrolyzates of gasoline having boiling point above 190° C. results in that condensed aromatic hydrocarbons (naphthalene, its alkyl substituted and other condensed aromatic hydrocarbons) whose presence inhibits the oligomerization process, are involved in the starting fraction subjected to oligomerization. The presence of condensed aromatic hydrocarbons also results in that dienes and cyclodienes being present in the raw material are readily condensed with said hydrocarbons thus forming toxic products having strong and unpleasant smell. The presence of condensed hydrocarbons in the starting fraction deteriorates such properties of solutions of the obtained resins in white spirit and in petroleum solvent as drying ability, impact strength and water resistance.

EXAMPLE 6 (NEGATIVE)

The polymeric petroleum resin was prepared from liquid pyrolyzates of gasoline (fractions having boiling point of 130° to 190° C.) basically as described in Examples 1 through 3. The same initiator being the mixture of cumyl hydroperoxide and calcium stearate was used. However, in contrast to the inventive process, the ratio between peroxide and hydroperoxide compounds, and salts of organic acids contained in the initiator was not utilized (weight ratio was 0.5:1). After heating the mixture up to a temperature of 160° C. and holding at this temperature for 12 hours, a polymeric petroleum resin was obtained, said resin being the end product. The yield of the end product was 240 kg or 24% by weight of the amount of the starting material or 3.6% by weight calculated as liquid pyrolyzates of gasoline. The resin thus obtained was examined to determine characteristics thereof. The results appeared to be as follows:

| molecular weight | 1200 |
|---|---|
| softening point, °C. | 95 |
| colour (according to the iodimetric scale) | 200 |

The resin is readily soluble in aromatic hydrocarbons, petroleum solvent and in the mixture of petroleum solvent and white spirit taken in a ratio of 1:2. The resin is not soluble in white spirit alone. Viscosity of a 60% solution of the resin in white spirit was 300 sec. The viscosity was taken using the above described procedure. The 60% solution of the resin in petroleum solvent was used for application of a coating to a metal and a glass plates. The coatings were applied by immersing said plates into the resin solution. Similarly, coatings were applied to control specimens of the same materials. The coatings of the control specimens were examined and tested in accordance with the above described procedures. The results appeared to be as follows:

| drying time at 20° C. hr: | |
|---|---|
| up to degree 1 | 3 |
| up to degree 3 | 7 |
| relative hardness of the coating in conventional units | 0.5 |
| bending strength of the coating, mm | 20 |
| impact strength of the coating, kg . cm | 5 |
| adhesion to the steel plate, points | 4 |
| settling, vol. % | no residue |
| water resistance of the coating | 24 hr without any changes |

The above data prove that failure to utilize the ratio between peroxide and hydroperoxide compounds, and salts of organic acids resulted in decrease in solubility of said resin in nontoxic solvents (white spirit), and in decrease in such chemical and physical properties of coatings as hardness, bending and impact strength, and adhesion.

EXAMPLE 7 (negative)

The polymeric petroleum resin was prepared from liquid pyrolyzates of gasoline (fractions having boiling point of 130° to 190° C.) basically as described in Examples 1 through 3. The same initiator being the mixture of cumyl hydroperoxide and calcium stearate was used. However, in contrast to the inventive process, the ratio between peroxide and hydroperoxide compounds, and salts of organic acids contains in the initiator was not kept to (weight ratio was 20:1). After heating the mixture up to a temperature of 160° C. and holding at this temperature for 15 hours, a polymeric petroleum resin was obtained, said resin being the end product. The yield of the end product was 200 kg or 20% by weight of the amount of the starting material or 3.0% by weight calculated as liquid pyrolyzates of gasoline. The resin thus obtained was examined to determine characteristics thereof. The results appeared to be as follows:

| molecular weight | 900 |
|---|---|
| softening point, °C. | 160 |
| colour (according to the iodimetric scale) | 200 |

The resin is readily soluble in aromatic hydrocarbons, petroleum solvent and in the mixture of petroleum solvent and white spirit taken in a ratio of 2:1. The resin is not soluble in white spirit alone. Viscosity of a 60% solution of the resin in petroleum solvent was 50 sec. The viscosity was taken using the above described procedure. The 60% solution of the resin in petroleum solvent was used for application of a coating to a metal and a glass plates. The coatings were applied by immersing said plates into the resin solution. Similarly, coatings were applied to control specimens of the same materials. The coatings of the control specimens were examined and tested in accordance with the above described procedures. The results appeared to be as follows:

| drying time at 20° C. , hr: | |
|---|---|
| up to degree 1 | 5 |
| up to degree 3 | 17 |
| relative hardness of the coating | 0.3 |
| bending strength of the coating, mm | 25 |
| impact strength of the coating, kg . cm | 10 |
| adhesion to the steel plate, points | 4 |
| settling, vol. % | no residue |
| water resistance of the coating | 24 hr without any changes |

The above data prove that failure to utilize the ratio between peroxide and hydroperoxide compounds, and salts of organic acids (weight ratio of 20:1) resulted in decrease in drying ability and in decrease in the yield of the resin.

EXAMPLE 8 (negative)

The polymeric petroleum resin was prepared from liquid pyrolyzates of gasoline (fractions having boiling point of 130° to 190° C.) basically as described in Examples 1 through 3. The same initiator being the mixture of cumyl hydroperoxide and calcium stearate was used (weight ratio therebetween 5:1). However, in contrast to the inventive process, the concentration of the initiator was not kept to (0.1% by weight).

After heating the mixture up to a temperature of 250° C. and holding at this temperature for 6 hours, a polymeric petroleum resin was obtained, said resin being the end product. The yield of the end product was 210 kg or 21% by weight of the amount of the starting material or 3.51% by weight calculated as liquid pyrolyzates. The resin thus obtained was examined to determine characteristics thereof. The results appeared to be as follows:

| molecular weight | 900 |
|---|---|
| softening point, °C. | 80 |
| colour (according to the iodimetric scale) | 180 |

Apart from toxic solvents, the resin was readily soluble in such nontoxic solvents as white spirit, petroleum solvent and a mixture thereof. Viscosity of a 60% solution of the resin in white spirit was 55 sec. The viscosity was taken using the above described procedure. The 60% solution of the resin in white spirit was used for application of a coating to a metal and a glass plates. The coating was applied by immersing said plates into the resin solution. Similarly, coatings were applied to control specimens of the same materials. The coatings of the control specimens were examined and tested in accordance with the above described procedures. The results appeared to be as follows:

| drying time at 20° C., hr: | |
|---|---|
| up to degree 1 | 1 |
| up to degree 3 | 6 |
| relative hardness of the coating in conventional units | 0.5 |
| bending strength of the coating, mm | 10 |
| impact strength of the coating, kg . cm | 10 |
| adhesion to the steel plate, points | 4 |
| settling, vol. % | no residue |
| water resistance of the coating | 24 hr without any changes |

The above data prove that failure to utilize the concentration of the initiator (0.1% by weight) resulted in decrease in the yield of the resin and in decrease in bending and impact strength of the coating.

EXAMPLE 9 (negative)

The polymeric petroleum resin was prepared from liquid pyrolyzates of gasoline (fractions having boiling point of 130° to 190° C.) basically as described in Examples 1 through 3. The same initiator being the mixture of cumyl hydroperoxide and calcium stearate was used (in a weight ratio of 5:1). However, in contrast to the inventive process, the concentration of the initiator was not kept to (3% by weight).

After heating the mixture up to a temperature of 250° C. and holding at this temperature for 6 hours, a polymeric petroleum resin was obtained, said resin being the end product. The yield of the end product was 360 kg or 36% by weight of the amount of the starting material or 5.4% by weight calculated as liquid pyrolyzates. The resin thus obtained was examined to determined characteristics thereof. The results appeared to be as follows:

| molecular weight | 400 |
|---|---|
| softening point, °C. | 50 |
| colour (according to the iodimetric scale) | 250 |

Apart from toxic solvents, the resin was readily soluble in such nontoxic solvents as white spirit, petroleum solvent and a mixture thereof. Voscosity of a 60% solution of the resin in white spirit was 15 sec. The viscosity was taken using the above described procedure. The 60% solution of the resin in white spirit was used for application of a coating to a metal and a glass plates. The coating was applied by immersing said plates into the resin solution. Similarly, coatings were applied to control specimens of the same materials. The coatings of the control specimens were examined and tested in accordance with the above described procedures. The results appeared to be as follows:

| drying time at 20° C., hr: | |
|---|---|
| up to degree 1 | 6 |
| up to degree 3 | 20 |
| relative hardness of the coating in conventional units | 0.2 |
| bending strength of the coating, mm | 25 |
| impact strength of the coating, kg . cm | 10 |
| adhesion to the steel plate, points | 4 |
| settling, vol. % | 8 |
| water resistance of the coating | 24 hr without any changes |

The above data prove that failure to utilize the concentration of the initiator (3.0% by weight) resulted in decrease in bending and impact strength of the coating and in formation of insoluble products.

EXAMPLE 10 (comparative)

The polymeric petroleum resin was prepared from liquid pyrolyzates of gasoline (fractions having boiling point of 130° to 190° C.) basically as described in Examples 1 through 3. However, in contrast to the inventive process, the initiator was not present. After heating the mixture up to a temperature of 250° C. and holding at this temperature for 6 hours, a polymeric petroleum resin was obtained, said resin being the end product. The yield of the end product was 200 kg or 20% by weight of the amount of the starting material or 3.0% by weight calculated as liquid pyrolyzates. The resin thus obtained was examined to determined characteristics thereof. The results appeared to be as follows:

| molecular weight | 900 |
|---|---|
| softening point, °C. | 80 |
| colour (according to the iodimetric scale) | 190 |

Apart from toxic solvents, the resin was readily soluble in such nontoxic solvents as white spirit, petroleum solvent and a mixture thereof. Viscosity of a 60% solution of the resin in white spirit was 55 sec. The viscosity was taken using the above described procedure. The 60% solution of the resin in white spirit was used for application of a coating to a metal and a glass plates. The coating was applied by immersing said plates into the resin solution. Similarly, coatings were applied to control specimens of the same materials. The coatings of the control specimens were examined and tested in accordance with the above described procedures. The results appeared to be as follows:

| | |
|---|---|
| drying time at 20° C., hr: | |
| up to degree 1 | 1 |
| up to degree 3 | 6 |
| relative hardness of the coating in conventional units | 0.3 |
| bending strength of the coating, mm | 15 |
| impact strength of the coating, kg . cm | 10 |
| adhesion to the steel plate, points | 4 |
| settling, vol. % | no residue |
| water resistance of the coating | 24 hr without any changes |

The above data prove that elimination of the initiator from the polymerization process resulted in decrease in the yield of the end product, in lowering the softening point of the resin, and in decrease in bending and impact strength of the coating.

EXAMPLE 11

The polymeric petroleum resin was prepared according to the invention as follows. Liquid pyrolyzates of gasoline, namely fractions having boiling point of 10° to 190° C. were used as a starting material. Said fractions in an amount of 994.5 kg were mixed with 5.5 kg of the initiator containing 5 kg of tertbutyl hydroperoxide and 0.5 kg of sodium naphthenate. Distillated naphthenic acids are petroleum acids extracted from the alkaline wastes obtained in rectifying oil and solar distillates. Distillated naphthenic acid forming the above salt is a transparent homogeneous liquid containing not less than 95% of naphthenic acids; colour (according to the iodimetric scale) is 27; acid number, mg KOH/g is not less than 220 to 260; iodine number, g $\tau_2/100$ g is up to 5.0. Thus the amount of the initiator in the reaction mixture was 0.55% by weight, while tert-butyl hydroperoxide and sodium naphthenate contained in the initiator were taken in a weight ratio of 10:1. The homogeneous mixture of liquid pyrolyzates and the initiator was heated up to a temperature of 200° C. and was held at this temperature for 10 hours. During this holding the gasoline pyrolyzates got polymerized forming a resin. Non-polymerized hydrocarbons were removed by a direct steam distillation. The residual polymeric petroleum resin was the end product of the process. The yield of the end product was 120 kg or 12% by weight of the amount of the starting material or 10.8% by weight calculated as liquid pyrolyzates of gasoline.

The resin thus obtained was of the following characteristics:

| | |
|---|---|
| molecular weight | 1000 |
| softening point, °C. | 85 |
| colour (according to the iodimetric scale) | 250 |

Apart from toxic solvents, the resin was readily soluble in such nontoxic solvents as white spirit, petroleum solvent and a mixture thereof. Viscosity of a 60% solution of the resin in white spirit was 60 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 7 |
| relative hardness of the coating in conventional units | 0.35 |
| bending strength of the coating, mm | 10 |
| impact strength of the coating, kg . cm | 40 |
| adhesion to the steel plate, points | 2 |
| settling, vol. % | no residue |
| water resistance of the coating | 24 hr without any changes |

The above data prove the exemplified modification of the process to allow the polymerization time to be cut 7-fold as compared with the prior art process (see USSR Inventor's Certificate No. 138,377).

EXAMPLE 12

The polymeric petroleum resin was prepared according to the invention as follows. Pyrolyzates of gaseous hydrocarbons, namely fractions having boiling point of 10° to 190° C. were used as a starting material. Said fractions in an amount of 994 kg were mixed with 6 kg of the initiator containing 3 kg of tert-butyl peroxide and 3 kg of cobalt naphthenate. Thus the amount of the initiator in the reaction mixture was 0.6% by weight, while tert-butyl peroxide and cobalt naphthenate contained in the initiator were taken in a weight ratio of 1:1. The homogeneous mixture of liquid pyrolyzates and the initiator was heated up to a temperature of 200° C. and was held at this temperature for 10 hours. During this holding the liquid pyrolyzates of gaseous products got polymerized forming a resin. Non-polymerized hydrocarbons were removed by a direct steam distillation. The residual polymeric petroleum resin was the end product of the process. The yield of the end product was 200 kg or 20% by weight of the amount of the starting material or 19% by weight calculated as liquid pyrolyzates of gaseous hydrocarbons.

The resin thus obtained was of the following characteristics:

| | |
|---|---|
| molecular weight | 900 |
| softening point, °C. | 50 |
| colour (according to the iodimetric scale) | 300 |

Apart from toxic solvents, the resin was readily soluble in such nontoxic solvents as white spirit, petroleum solvent and a mixture thereof. Viscosity of a 60% solution of the resin in white spirit was 52 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 3 |
| up to degree 3 | 7 |
| relative hardness of the coating in conventional units | 0.3 |
| bending strength of the coating, mm | 10 |
| impact strength of the coating, kg . cm | 50 |
| adhesion to the steel plate, points | 2 |
| settling, vol. % | no residue |
| water resistance of the coating | 24 hr without any changes |

The above data prove the exemplified modification of the process to allow the polymerization time to be cut 10-fold and the yield of the end product to be increased 4.5-fold as compared with the prior art process (see USSR Inventor's Certificate No. 138,377).

EXAMPLE 13

The polymeric petroleum resin was prepared according to the invention as follows. Liquid pyrolyzates of gasoline, namely fractions having boiling point of 10° to 190° C. were used as a starting material. Said fractions in an amount of 990 kg were mixed with 10 kg of the initiator containing 7 kg of cumyl peroxide and 3 kg of barium salt of a fatty ($C_5$-$C_6$) acid.

The fatty ($C_5$-$C_6$) acid forming the above salt is a transparent oily liquid being colorless or yellowish.

Acid number, mg KOH/g is not less than 420 to 500
Ester number, mg KOH/g is up to 1.

Thus the amount of the initiator in the reaction mixture was 1.0% by weight, while cumyl peroxide and barium salt of a fatty ($C_5$-$C_6$) acid contained in the initiator were taken in a weight ratio of 2.3:1. The homogeneous mixture of liquid pyrolyzates and the initiator was heated up to a temperature of 200° C. and was held at this temperature for 12 hours. During this holding the liquid pyrolyzates of gasoline got polymerized forming a resin. Non-polymerized hydrocarbons were removed by a direct steam distillation. The residual polymeric petroleum resin was the end product of the process. The yield of the end product was 163 kg or 16.3% by weight of the amount of the starting material or 15.2% by weight calculated as liquid pyrolyzates of gasoline.

The resin thus obtained was of the following characteristics:

| | |
|---|---|
| molecular weight | 700 |
| softening point, °C. | 64 |
| colour (according to the iodimetric scale) | 300 |

Apart from toxic solvents, the resin was readily soluble in such nontoxic solvents as white spirit, petroleum solvent and a mixture thereof. Voscosity of a 60% solution of the resin in white spirit was 47 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 8 |
| relative hardness of the coating in conventional units | 0.3 |
| bending strength of the coating, mm | 5 |
| impact strength of the coating, kg . cm | 40 |
| adhesion to the steel plate, points | 3 |
| settling, vol. % | no residue |
| water resistance of the coating | 24 hr without any changes |

The above data prove the exemplified modification of the process to allow the polymerization time to be cut 9-fold and the yield of the end product to be increased 3.5-fold as compared with the prior art process (see USSR Inventor's Certificate No. 138,377).

EXAMPLE 14

The polymeric petroleum resin was prepared according to the invention as follows. Liquid products of a high-temperature pyrolysis of gasoline (1200° to 1400° C.), namely fractions having boiling point of 10° to 190° C. were used as a starting material. Said fractions in an amount of 990 kg were mixed with 10 kg of the initiator containing 8 kg of 2,2-di-(tert-butylperoxy) butane and 2 kg of potassium salt of a fatty ($C_7$-$C_9$) acid.

The fatty ($C_7$-$C_9$) acid forming the above salt is a transparent oily liquid being colorless or yellowish.

Acid number, mg KOH/g is not less than 370 to 410
Ester number, mg KOH/g is up to 3.

Thus the amount of the initiator in the reaction mixture was 1.0% by weight, while 2,2-di-(tert-butylperoxy) butane and potassium salt of the fatty ($C_7$-$C_9$) acid contained in the initiator were taken in a weight ratio of 4:1. The homogeneous mixture of liquid pyrolyzates and the initiator was heated up to a temperature of 180° C. and was held at this temperature for 20 hours. During this holding liquid products of the high-temperature (1200° to 1400° C.) pyrolysis got polymerized forming a resin. Non-polymerized hydrocarbons were treated with alcohol and then a petroleum resin being the end product of the process was separated by settling. The yield of the end product was 150 kg or 15% by weight of the amount of the starting material or 13.5% by weight calculated as liquid products of the high-temperature pyrolysis.

The resin thus obtained was of the following characteristics:

| | |
|---|---|
| molecular weight | 650 |
| softening point, °C. | 65 |
| colour (according to the iodimetric scale) | 320 |

Apart from toxic solvents, the resin was readily soluble in such nontoxic solvents as white spirit, petroleum solvent and a mixture thereof. Viscosity of a 60% solution of the resin in white spirit was 35 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| drying time, hr: | |
|---|---|
| up to degree 1 | 3 |
| up to degree 3 | 8 |
| relative hardness of the coating | 0.35 |
| bending strength of the coating, mm | 10 |
| impact strength of the coating, kg . cm | 45 |
| adhesion to the steel plate, points | 2 |
| settling, vol. % | no residue |
| water resistance | 24 hr without any changes |

The above data prove the exemplified modification of the process to allow the polymerization time to be cut 8-fold as compared with the prior art process (see USSR Inventor's Certificate No. 138,377).

EXAMPLE 15

The polymeric petroleum resin was prepared according to the invention as follows. Liquid pyrolyzates of gaseous hydrocarbons, namely fractions having boiling point of 10° to 190° C. were used as a starting material. Said fractions in an amount of 985 kg were mixed with 15 kg of the initiator containing 10 kg of 1-oxy-1-hydroperoxy cyclohexyl peroxide and 5 kg of sodium octylbenzoate. Thus the amount of the initiator in the reaction mixture was 1.5% by weight, while 1-oxy-1-hydroperoxy cyclohexyl peroxide and sodium octylbenzoate contained in the mixture was taken in a weight ratio of 2:1. The homogeneous mixture of liquid pyrolyzates and the initiator was heated up to a temperature of 250° C. and was held at this temperature for 20 hours. During this holding the liquid pyrolyzates of gaseous hydrocarbons got polymerized forming a resin. Non-polymerized hydrocarbons were removed by a direct steam distillation. The residual polymeric petroleum resin was the end product of the process. The yield of the end product was 250 kg or 25% by weight of the amount of the starting material or 22.5% by weight calculated as liquid pyrolyzates.

The resin thus obtained was of the following characteristics:

| molecular weight | 750 |
|---|---|
| softening point, °C. | 80 |
| colour (according to the iodimetric scale) | 250 |

Apart from toxic solvents, the resin was readily soluble in such nontoxic solvents as white spirit, petroleum solvent and a mixture thereof. Viscosity of a 60% solution of the resin in white spirit was 40 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| drying time, hr: | |
|---|---|
| up to degree 1 | 2 |
| up to degree 3 | 6 |
| relative hardness of the coating in conventional units | 0.4 |
| bending strength of the coating, mm | 10 |
| impact strength of the coating, kg . cm | 40 |
| adhesion to the steel plate, points | 3 |
| settling, vol. % | no residue |
| water resistance of the coating | 24 hr without any changes |

The above data prove the exemplified modification of the process to allow the polymerization time to be cut 6-fold as compared with the prior art process (see USSR Inventor's Certificate No. 138,377).

EXAMPLE 16

The polymeric petroleum resin was prepared according to the invention as follows. Liquid pyrolyzates of the kerosene-gas oil fraction having boiling point of 10° to 190° C. were used as a starting material. Said fractions in an amount of 980 kg were mixed with 20 kg of the initiator containing 18 kg of tertbutyl perbenzoate and 2 kg of molybdenum benzoate. Thus the amount of the initiator in the reaction mixture was 2.0% by weight, while tertbutyl perbenzoate and molybdenum benzoate contained in the reaction mixture were taken in a weight ratio of 9:1. The homogeneous mixture of liquid pyrolyzates and the initiator was heated up to a temperature of 250° C. and was held at this temperature for 20 hours. During this holding the liquid pyrolyzates of the kerosene-gas oil fraction got polymerized forming a resin. Non-polymerized hydrocarbons were removed by a direct steam distillation. The yield of the end product was 150 kg or 15% by weight of the amount of the starting material or 13.5% by weight calculated as liquid pyrolyzates.

The resin thus obtained was of the following characteristics:

| molecular weight | 680 |
|---|---|
| softening point, °C. | 75 |
| colour (according to the iodimetric scale) | 300 |

Apart from toxic solvents, the resin was readily soluble in such nontoxic solvents as white spirit, petroleum solvent and a mixture thereof. Viscosity of a 60% solution of the resin in white spirit was 35 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| drying time, hr: | |
|---|---|
| up to degree 1 | 3 |
| up to degree 3 | 7 |
| relative hardness of the coating in conventional units | 0.4 |
| bending strength of the coating, mm | 10 |
| impact strength of the coating, kg . cm | 45 |
| adhesion to the steel plate, points | 2 |
| settling, vol. % | no residue |
| water resistance | 24 hr without any changes |

The above data prove the exemplified modification of the process to allow the polymerization time to be cut 8-fold and the yield of the end product to be increased 3.5-fold as compared with the prior art process (see USSR Inventor's Certificate No. 138,377).

EXAMPLE 17

The polymeric petroleum resin was prepared according to the invention as follows. Liquid pyrolyzates of the kerosene-gas oil fraction having boiling point of 10° to 190° C. were used as a starting material. Said fractions in an amount of 998 kg were mixed with 2 kg of the initiator containing 1 kg of tert-butyl peracetate and 1 kg of molybdenum cyclohexene carbonate. Thus the amount of the initiator in the reaction mixture was 0.2% by weight, while tert-butyl peracetate and molybdenum cyclohexene carbonate contained in the reaction mixture were taken in a weight ratio of 1:1. The homogeneous mixture of liquid pyrolyzates and the initiator was heated up to a temperature of 250° C. and was held at this temperature for 20 hours. During this holding the liquid pyrolyzates of the kerosene-gas oil fraction got polymerized forming a resin. Non-polymerized hydrocarbons were removed by an atmospheric vacuum distillation. The residual polymeric petroleum resin was the end product of the process. The yield of the end product was 105 kg or 10.5% by weight of the amount of the starting material or 9.35% by weight calculated as liquid pyrolyzates.

The resin thus obtained was of the following characteristics:

| | |
|---|---|
| molecular weight | 650 |
| softening point, °C. | 78 |
| colour (according to the iodimetric scale) | 280 |

Apart from toxic solvents, the resin was readily soluble in such nontoxic solvents as white spirit, petroleum solvent and a mixture thereof. Viscosity of a 60% solution of the resin in white spirit was 34 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 7 |
| relative hardness of the coating | 0.35 |
| bending strength of the coating, mm | 5 |
| impact strength of the coating, kg . cm | 45 |
| adhesion to the steel plate, points | 2 |
| settling, vol. % | no residue |
| water resistance of the coating | 24 hr without any changes |

The above data prove the exemplified modification of the process to allow the polymerization time to be cut 8-fold as compared with the prior art process (see USSR Inventor's Certificate No. 138,377).

EXAMPLE 18

The polymeric petroleum resin was prepared according to the invention as follows. Liquid pyrolyzates of gasoline, namely fractions having boiling point of 10° to 190° C. were used as a starting material. Said fractions in an amount of 990 kg were mixed with 10 kg of the initiator containing 9.5 kg lauryl peroxide and 0.5 kg of calcium methylcyclohexene carbonate. Thus the amount of the initiator in the reaction mixture was 1.0% by weight, while lauryl peroxide and calcium methylcyclohexene carbonate contained in the initiator were taken in a weight ratio of 19:1. The homogeneous mixture of liquid pyrolyzates and the initiator was heated up to a temperature of 250° C. and was held at this temperature for 15 hours. During this holding the liquid pyrolyzates of gasoline got polymerized forming a resin. Non-polymerized hydrocarbons were removed by a direct steam distillation. The residual polymeric petroleum resin was the end product of the process. The yield of the end product was 145 kg or 14.5% by weight of the amount of the starting material or 13.05% by weight calculated as liquid pyrolyzates of gasoline.

The resin thus obtained was of the following characteristics:

| | |
|---|---|
| molecular weight | 700 |
| softening point, °C. | 70 |
| colour (according to the iodimetric scale) | 250 |

Apart from toxic solvents, the resin was readily soluble in such nontoxic solvents as white spirit, petroleum solvent and a mixture thereof. Viscosity of a 60% solution of the resin in white spirit was 38 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time, hr: | |
| up to degree 1 | 2 |
| up to degree 3 | 7 |
| relative hardness | 0.35 |
| bending strength of the coating, mm | 5 |
| impact strength of the coating, kg . cm | 45 |
| adhesion to the steel plate, points | 2 |
| settling, vol. % | no residue |
| water resistance | 24 hr without any changes |

The above data prove the exemplified modification of the process to allow the polymerization time to be cut 9-fold and the yield of the end product to be increased 3-fold as compared with the prior art process (see USSR Inventor's Certificate No. 138,377).

EXAMPLE 19

The polymeric petroleum resin was prepared according to the invention as follows. Liquid pyrolyzates of gasoline, namely fractions having boiling point of 10° to 190° C. were used as a starting material. Said fractions in an amount of 980 kg were mixed with 20 kg of the initiator containing 10 kg of benzoyl peroxide and 10 kg of cobalt tetrahydrophthalate. Thus the amount of the initiator in the reaction mixture was 2.0% by weight, while benzoyl peroxide and cobalt tetrahydrophthalate contained in the initiator were taken in a weight ratio of 1:1. The homogeneous mixture of liquid pyrolyzates and the initiator was heated up to a temperature of 150° C. and was held at this temperature for 20 hours. During this holding liquid pyrolyzates of gasoline got polymerized forming a resin. Non-polymerized hydrocarbons were removed by rectification followed by distillation thereof in a film evaporator. The residual polymeric petroleum resin was the end product of the process. The yield of the end product was 165 kg or 16.5% by weight of the amount of the starting material or 14.85% by weight calculated as liquid pyrolyzates of gasoline.

The resin thus obtained was of the following characteristics:

| | |
|---|---|
| molecular weight | 580 |
| softening point, °C. | 63 |
| colour (according to the iodimetric scale) | 300 |

Apart from toxic solvents, the resin was readily soluble in such nontoxic solvents as white spirit, petroleum solvent and a mixture thereof. Viscosity of a 60% solution of the resin in white spirit was 40 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 3 |
| up to degree 3 | 9 |
| relative hardness | 0.3 |
| bending strength of the coating, mm | 10 |
| impact strength of the coating, kg . cm | 45 |
| adhesion to the steel plate, points | 2 |
| settling, vol. % | no residue |
| water resistance | 24 hr without any changes |

The above data prove the exemplified modification of the process to allow the polymerization time to be cut 8-fold and the yield of the end product to be increased 3.6-fold as compared with the prior art process (see USSR Inventor's Certificate No. 138,377).

EXAMPLE 20

The polymeric petroleum resin was prepared according to the invention as follows. A mixture of fractions of liquid pyrolyzates of petroleum hydrocarbons having boiling point of 20° to 65° C. and that of 130° to 190° C. in a weight ratio therebetween of 1:3, was used as a starting material. Said mixture of fractions in an amount of 990 kg was mixed with an initiator containing 9 kg of peracetic acid and 1 kg of vanadium salt of monooctyl ether of tetrahydrophthalic acid. Thus the amount of the initiator in the reaction mixture was 1.0% by weight, while peracetic acid and vanadium salt of monooctyl ether of tetrahydrophthalic acid contained in the initiator were taken in a weight ratio of 9:1. The homogeneous mixture of liquid pyrolyzates and the initiator was heated up to a temperature of 200° C. and was held at this temperature for 20 hours. During this holding said mixture of fractions of products of a high-temperature pyrolysis of petroleum hydrocarbons got polymerized forming a resin. Non-polymerized hydrocarbons were removed by a direct steam distillation. The residual polymeric petroleum resin was the end product of the process. The yield of the end product was 360 kg or 36% by weight of the amount of the starting material or 6.91% by weight calculated as liquid pyrolyzates.

The resin thus obtained was of the following characteristics:

| | |
|---|---|
| molecular weight | 600 |
| softening point, °C. | 78 |
| colour (according to the iodimetric scale) | 270 |

Apart from toxic solvents, the resin was readily soluble in such nontoxic solvents as white spirit, petroleum solvent and a mixture thereof. Viscosity of a 60% solution of the resin in white spirit was 35 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 6 |
| relative hardness | 0.3 |
| bending strength of the coating, mm | 10 |
| impact strength of the coating, kg . cm | 45 |
| adhesion to the steel plate, points | 2 |
| settling, vol. % | no residue |
| water resistance | 24 hr without any changes |

The above data prove the exemplified modification of the process to allow the polymerization time to be cut 7-fold and the yield of the end product to be increased 1.6-fold as compared with the prior art process (see USSR Inventor's Certificate No. 138,377).

EXAMPLE 21

The polymeric petroleum resin was prepared according to the invention as follows. A mixture of fractions of products of a high-temperature pyrolysis of petroleum hydrocarbons having boiling point of 20° to 65° C. and that of 130° to 190° C. taken in a weight ratio of 1:2, was used as a starting material. Said mixture of fractions in an amount of 990 kg was mixed with 10 kg of the initiator containing 9 kg of perbenzoic acid and 1 kg of calcium oleinate. Thus the amount of the initiator in the reaction mixture was 1.0% by weight, while perbenzoic acid and calcium oleinate contained in the initiator were taken in a weight ratio of 9:1. The homogeneous mixture of liquid pyrolyzates and the initiator was heated up to a temperature of 250° C. and was held at this temperature for 10 hours. During this holding liquid pyrolyzates got polymerized forming a resin. Non-polymerized hydrocarbons were removed by a direct steam distillation. The residual polymeric petroleum resin was the end product of the process. The yield of the end product was 350 kg or 35% by weight of the amount of the starting material or 5.95% by weight calculated as liquid pyrolyzates.

The resin thus obtained was of the following characteristics:

| | |
|---|---|
| molecular weight | 580 |
| softening point, °C. | 72 |
| colour (according to the iodimetric scale) | 290 |

Apart from toxic solvents, the resin was readily soluble in such nontoxic solvents as white spirit, petroleum solvent and a mixture thereof. Viscosity of a 60% solution of the resin in white spirit was 30 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 6 |
| relative hardness | 0.35 |
| bending strength of the coating, mm | 10 |
| impact strength of the coating, kg . cm | 50 |
| adhesion to the steel plate, points | 2 |
| settling, vol. % | no residue |
| water resistance | 24 hr without any changes |

The above data prove the exemplified modification of the process to allow the polymerization time to be cut 10-fold and the yield of the end product to be increased 1.3-fold as compared with the prior art process (see USSR Inventor's Certificate No. 138,377).

EXAMPLE 22

The polymeric petroleum resin was prepared according to the invention as follows. Liquid pyrolyzates of gaseous hydrocarbons, namely fractions having boiling point of 130° to 190° C. were used as a starting material. Said fractions in an amount of 990 kg were mixed with 10 kg of the initiator containing 9.5 kg of cumyl hydroperoxide and 0.5 kg of sodium oleate. Thus the amount of the initiator in the reaction mixture was 1.0% by weight, while cumyl hydroperoxide and sodium oleate contained in the initiator were taken in a weight ratio of 19:1. The homogeneous mixture of liquid pyrolyzates and the initiator was heated up to a temperature of 250° C. and was held at this temperature for 10 hours. During this holding liquid pyrolyzates got polymerized forming a resin. Non-polymerized hydrocarbons were removed by rectification followed by distillation thereof in a film evaporator. The residual polymeric petroleum resin was the end product of the process. The yield of the end product was 430 kg or 43% by weight of the amount of the starting material or 7.74% by weight calculated as liquid pyrolyzates of hydrocarbons.

The resin thus obtained was of the following characteristics:

| | |
|---|---|
| molecular weight | 950 |
| softening point, °C. | 90 |
| colour (according to the iodimetric scale) | 200 |

Apart from toxic solvents, the resin was readily soluble in such nontoxic solvents as white spirit, petroleum solvent and a mixture thereof. Viscosity of a 60% solution of the resin in white spirit was 60 sec. The viscosity was taken using the above described procedure. The 60% solution of the resin in white spirit was used for application of a coating to a steel plate by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 1 |
| up to degree 3 | 6 |
| relative hardness in conventional units | 0.3 |
| bending strength of the coating, mm | 10 |
| impact strength of the coating, kg . cm | 35 |
| adhesion to the steel plate, points | 2 |
| settling, vol. % | no residue |
| water resistance | 24 hr without any changes |

The above data prove the exemplified modification of the process to allow the polymerization time to be cut 10-fold and the yield of the end product to be increased 1.7-fold as compared with the prior art process (see USSR Inventor's Certificate No. 138,377).

EXAMPLE 23

The polymeric petroleum resin was prepared according to the invention as follows. Liquid pyrolyzates of kerosene-gas oil fraction, namely fractions having boiling point of 130° to 190° C. were used as a starting material. Said fractions in an amount of 985 kg were mixed with 15 kg of the initiator containing 14 kg of cumyl hydroperoxide, 0.5 kg of calcium oleate, and 0.5 kg of molybdenum oleate. Thus the amount of the initiator in the reaction mixture was 1.5% by weight, while cumyl hydroperoxide and the mixture of calcium oleate and molybdenum oleate contained in the initiator were taken in a weight ratio of 14:1. The homogeneous mixture of liquid pyrolyzates and the initiator was heated up to a temperature of 250° C. and was held at this temperature for 10 hours. During this holding liquid pyrolyzates of the kerosene-gas oil fraction got polymerized forming a resin. Non-polymerized hydrocarbons were removed by a direct steam distillation. The residual polymeric petroleum resin was the end product of the process. The yield of the end product was 350 kg or 35% by weight of the amount of the starting material or 7.0% by weight calculated as liquid pyrolyzates of the kerosene-gas oil fraction.

The resin thus obtained was of the following characteristics

| | |
|---|---|
| molecular weight | 750 |
| softening point, °C. | 93 |
| colour (according to the iodimetric scale) | 260 |

Apart from toxic solvents, the resin was readily soluble in such nontoxic solvents as white spirit, petroleum solvent and a mixture thereof. Viscosity of a 60% solution of the resin in white spirit was 40 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 6 |
| relative hardness in conventional units | 0.3 |
| bending strength of the coating, mm | 10 |
| impact strength of the coating, kg . cm | 30 |
| adhesion to the steel plate, points | 3 |
| settling, vol. % | no residue |
| water resistance | 24 hr without any changes |

The above data prove the exemplified modification of the process to allow the polymerization time to cut 9-fold and the yield of the end product to be increased 1.6-fold as compared with the prior art process (see USSR Inventor's Certificate No. 138,377).

EXAMPLE 24

The polymeric petroleum resin was prepared according to the invention as follows. Liquid pyrolyzates of gaseous petroleum hydrocarbons, namely fractions having boiling point of 130° to 190° C. were used as a starting material. Said fractions in an amount of 985 kg were mixed with 15 kg of the initiator containing 14 kg of dicumyl peroxide and a mixture of potassium oleate and cobalt oleate taken in a weight ratio of 1:1 (0.5 kg each). Thus the amount of the initiator in the reaction mixture was 1.5% by weight, while dicumyl peroxide and said mixture of potassium oleate and cobalt oleate contained in the initiator were taken in a weight ratio of 14:1. The homogeneous mixture of liquid pyrolyzates and the initiator was heated up to a temperature of 250° C. and was held at this temperature for 10 hours. During this holding liquid pyrolyzates of gaseous petroleum hydrocarbons got polymerized forming a resin. Non-polymerized hydrocarbons were removed by a direct steam distillation. The residual polymeric petroleum resin was the end product of the process. The yield of the end product was 330 kg or 33% by weight of the amount of the starting material or 5.94% by weight calculated as liquid pyrolyzates of petroleum hydrocarbons.

The resin thus obtained was of the following characteristics:

| | |
|---|---|
| molecular weight | 850 |
| softening point, °C. | 90 |
| colour (according to the iodimetric scale) | 270 |

Apart from toxic solvents, the resin was readily soluble in such nontoxic solvents as white spirit, petroleum solvent and a mixture thereof. Viscosity of a 60% solution of the resin in white spirit was 57 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 7 |
| relative hardness in conventional units | 0.35 |
| bending strength of the coating, mm | 15 |
| impact strength of the coating, kg . cm | 30 |
| adhesion to the steel plate, points | 3 |
| settling, vol. % | no residue |
| water resistance | 24 hr without any changes |

The above data prove the exemplified modification of the process to allow the polymerization time to be cut 10-fold and the yield of the end product to be increased 1.3-fold as compared with the prior art process (see USSR Inventor's Certificate No. 138,377).

EXAMPLE 25

The polymeric petroleum resin was prepared according to the invention as follows. Liquid pyrolyzates of gaseous petroleum hydrocarbons, namely fractions having boiling point of 130° to 190° C. were used as a starting material. Said fractions in an amount of 990 kg were mixed with 10 kg of the initiator containing 9.5 kg of benzoyl peroxide, 0.25 kg of sodium naphthenate, and 0.25 kg of vanadium naphthenate. Thus the amount of the initiator in the reaction mixture was 1.0% by weight, while benzoyl peroxide and the mixture of sodium and vanadium naphthenates (in a weight ratio therebetween of 1:1) contained in the initiator were taken in a weight ratio of 19:1. The homogeneous mixture of liquid pyrolyzates and the initiator was heated up to a temperature of 250° C. and was held at this temperature for 10 hours. During this holding liquid pyrolyzates of gaseous petroleum hydrocarbons got polymerized forming a resin. Non-polymerized hydrocarbons were removed by a direct steam distillation. The residual polymeric petroleum resin was the end product of the process. The yield of the end product was 350 kg or 35% by weight of the amount of the starting material or 6.3% by weight calculated as liquid pyrolyzates.

The resin thus obtained was of the following characteristics:

| | |
|---|---|
| molecular weight | 900 |
| softening point, °C. | 91 |
| colour (according to the iodimetric scale) | 220 |

Apart from toxic solvents, the resin was readily soluble in such nontoxic solvents as white spirit, petroleum solvent and a mixture thereof. Viscosity of a 60% solution of the resin in white spirit was 60 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 6 |
| relative hardness in conventional units | 0.3 |
| bending strength of the coating, mm | 10 |
| impact strength of the coating, kg . cm | 30 |
| adhesion to the steel plate, points | 3 |
| settling, vol. % | no residue |
| water resistance | 24 hr without any changes |

The above data prove the exemplified modification of the process to allow the polymerization time to be cut 11-fold and the yield of the end product to be increased 1.5-fold as compared with the prior art process (see USSR Inventor's Certificate No. 138,377).

EXAMPLE 26

The polymeric petroleum resin was prepared according to the invention as follows. Liquid products of a high-temperature (1200° to 1400° C.) pyrolysis of the pentane-hexane fraction, namely fractions having boiling point of 130° to 190° C. were used as a starting material. Said fractions in an amount of 980 kg were mixed with 20 kg of the initiator containing 10 kg of tertbutyl hydroperoxide and 10 kg of a mixture consisting of potassium, calcium, magnesium, and molybdenum oleinates (2.5 kg of each of the above salts). Thus the amount of the initiator in the reaction mixture was 2.0% by weight, while tertbutyl hydroperoxide and the mixture of potassium, calcium, magnesium, and molybdenum oleinates contained in the initiator were taken in a weight ratio of 1:1. The homogeneous mixture of liquid pyrolyzates and the initiator was heated up to a temperature of 250° C. and was held at this temperature for 3 hours. During this holding liquid products of a high-temperature (1200° to 1400° C.) pyrolysis got polymerized forming a resin. Non-polymerized hydrocarbons were removed by a direct steam distillation. The residual polymeric petroleum resin was the end product of the process. The yield of the end product was 280 kg or 28% by weight of the amount of the starting material or 4.2% by weight calculated as liquid pyrolyzates.

The resin thus obtained was of the following characteristics:

| | |
|---|---|
| molecular weight | 850 |
| softening point, °C. | 90 |
| colour (according to the iodimetric scale) | 220 |

Apart from toxic solvents, the resin was readily soluble in such nontoxic solvents as white spirit, petroleum solvent and a mixture thereof. Viscosity of a 60% solution of the resin in white spirit was 70 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 7 |
| relative hardness in conventional units | 0.3 |
| bending strength of the coating, mm | 10 |
| impact strength of the coating, kg . cm | 30 |
| adhesion to the steel plate, points | 3 |
| settling, vol. % | no residue |
| water resistance | 24 hr without any changes |

The above data prove the exemplified modification of the process to allow the polymerization time to be cut 30-fold as compared with the prior art process (see USSR Inventor's Certificate No. 138,377).

EXAMPLE 27

The polymeric petroleum resin was prepared according to the invention as follows. Liquid pyrolyzates of the kerosene-gas oil fraction, namely fractions having boiling point of 10° to 190° C. were used as a starting material. Said fractions in an amount of 980 kg were mixed with 20 kg of the initiator containing 16 kg of a mixture consisting of tert-butyl peroxide and cumyl hydroperoxide taken in a weight ratio of 1:1, and 4 kg of molybdenum alkyl benzoate (number of carbon atoms in the side chain being $C_{12}-C_{16}$). Thus the amount of the initiator in the reaction mixture was 2.0% by weight, while the mixture of the tert-butyl peroxide, cumyl hydroperoxide, and molybdenum alkyl benzoate contained in the initiator were taken in a weight ratio of 4:1. The homogeneous mixture of liquid pyrolyzates and the initiator was heated up to a temperature of 250° C. and was held at this temperature for 8 hours. During this holding liquid products of the kerosene-gas oil fraction got polymerized forming a resin. Non-polymerized hydrocarbons were removed by a direct steam distillation. The residual polymeric petroleum resin was the end product of the process. The yield of the end product was 183 kg or 18.3% by weight of the amount of the starting material or 16.3% by weight calculated as liquid pyrolyzates.

The resin thus obtained was of the following characteristics:

| | |
|---|---|
| molecular weight | 820 |
| softening point, °C. | 65 |
| colour (according to the iodimetric scale) | 500 |

Apart from toxic solvents, the resin was readily soluble in such nontoxic solvents as white spirit, petroleum solvent and a mixture thereof. Viscosity of a 60% solution of the resin in white spirit was 45 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2.5 |
| up to degree 3 | 8 |
| relative hardness in conventional units | 0.35 |
| bending strength of the coating, mm | 5 |
| impact strength of the coating, kg . cm | 50 |

| | |
|---|---|
| adhesion to the steel plate, points | 2 |
| settling, vol. % | no residue |
| water resistance | 24 hr without any changes |

The above data prove the exemplified modification of the process to allow the polymerization time to be cut 12-fold and the yield of the end product to be increased 4-fold as compared with the prior art process (see USSR Inventor's Certificate No. 138,377).

EXAMPLE 28

The polymeric petroleum resin was prepared according to the invention as follows. Liquid pyrolyzates of gasoline, namely fractions having boiling point of 10° to 190° C. were used as a starting material. Said fractions in an amount of 980 kg were mixed with 20 kg of the initiator containing 10 kg of dicumyl peroxide and 10 kg of vanadium acetate. Thus the amount of the initiator in the reaction mixture was 2.0% by weight, while dicumyl peroxide and vanadium acetate contained in the initiator were taken in a weight ratio of 1:1. The homogeneous mixture of liquid pyrolyzates and the initiator was heated up to a temperature of 80° C. and was held at this temperature for 20 hours. During this holding liquid pyrolyzates of gasoline got polymerized forming a resin. Non-polymerized hydrocarbons were removed by a direct steam destillation. The residual polymeric petroleum resin was the end product of the process. The yield of the end product was 140 kg or 14.0% by weight of the amount of the starting material.

The resin thus obtained was of the following characteristics:

| | |
|---|---|
| molecular weight | 700 |
| softening point, °C. | 65 |
| colour (according to the iodimetric scale) | 400 |

Apart from toxic solvents, the resin was readily soluble in such nontoxic solvents as white spirit, petroleum solvent and a mixture thereof. Viscosity of a 60% solution of the resin in white spirit was 35 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time at 20° C., hr: | |
| up to degree 1 | 2 |
| up to degree 3 | 8 |
| relative hardness in conventional units | 0.4 |
| bending strength of the coating, mm | 10 |
| impact strength of the coating, kg . cm | 50 |
| adhesion to the steel plate, points | 2 |
| settling, vol. % | no residue |
| water resistance | 24 hr without any changes |

The above data prove the exemplified modification of the process to allow the polymerization time to be cut 6-fold as compared with the prior art process (see USSR Inventor's Certificate No. 138,377).

EXAMPLE 29

The polymeric petroleum resin was prepared according to the invention as follows. Liquid pyrolyzates of gaseous petroleum hydrocarbons, namely fractions having boiling point of 10° to 190° C. were used as a starting material. Said fractions in an amount of 995 kg was mixed with 5.5 kg of the initiator containing 5 kg of tert-butyl peroxide and 0.5 kg of cobalt naphthenate. Thus the amount of the initiator in the reaction mixture was 0.5% by weight, while tertbutyl peroxide and cobalt naphthenate contained in the initiator were taken in a weight ratio of 10:1. The homogeneous mixture of liquid pyrolyzates and the initiator was heated up to a temperature of 250° C. and was held at this temperature for 5 hours. During this holding liquid pyrolyzates of gaseous petroleum hydrocarbons got polymerized forming a resin. Non-polymerized hydrocarbons were removed by a direct steam distillation. The residual polymeric petroleum resin was the end product of the process. The yield of the end product was 200 kg or 20.0% by weight of the amount of the starting material.

The resin thus obtained was of the following characteristics:

| | |
|---|---|
| molecular weight | 850 |
| softening point, °C. | 50 |
| colour (according to the iodimetric scale) | 350 |

Apart from toxic solvents, the resin was readily soluble in such nontoxic solvents as white spirit, petroleum solvent and a mixture thereof. Viscosity of a 60% solution of the resin in white spirit was 45 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| | |
|---|---|
| drying time, hr: | |
| up to degree 1 | 3 |
| up to degree 3 | 7 |
| relative hardness in conventional units | 0.4 |
| bending strength of the coating, mm | 10 |
| impact strength of the coating, kg . cm | 50 |
| adhesion to the steel plate, points | 2 |
| settling, vol. % | no residue |
| water resistance | 24 hr without any changes |

The above data prove the exemplified modification of the process to allow the polymerization time to be cut 20-fold as compared with the prior art process (see USSR Inventor's Certificate No. 138,377).

EXAMPLE 30

The polymeric petroleum resin was prepared according to the invention as follows. Liquid pyrolyzates of gasoline, namely fractions having boiling point of 10° to 190° C. were used as a starting material. Said fractions in an amount of 989 kg was mixed with 11 kg of the initiator containing 10 kg of a mixture consisting of cumyl hydroperoxide and isopropyl benzene taken in a weight ratio of 1:1, and 1 kg of magnesium naphthenate Thus the amount of the initiator in the reaction mixture was 1.1% by weight, while the mixture of cumyl hydroperoxide, isopropyl benzene, and magnesium naphthenate contained in the initiator was taken in a weight ratio of 10:1. The homogeneous mixture of liquid pyrolyzates and the initiator was heated up to a temperature of 160° C. and was held at this temperature for 15 hours. During this holding liquid pyrolyzates of gasoline got polymerized forming a resin. Non-polymerized hydrocarbons were removed by a direct steam distillation. The residual polymeric petroleum resin was the end product of the process. The yield of the end product was 167 kg or 16.7% by weight of the amount of the starting material.

The resin thus obtained was of the following characteristics:

| molecular weight | 740 |
|---|---|
| softening point, °C. | 64 |
| colour (according to the iodimetric scale) | 300 |

Apart from toxic solvents, the resin was readily soluble in such nontoxic solvents as white spirit, petroleum solvent and a mixture thereof. Viscosity of a 60% solution of the resin in white spirit was 40 sec. The viscosity was taken using the above described procedure. The 60% solution of the resin in white spirit was used for application of a coating to a steel plate. The coating was applied by immersing said plate into the resin solution. Similarly, coatings were applied to control specimens of the same material. The coatings of the control specimens were examined and tested in accordance with the above described procedures. The results appeared to be as follows:

| drying time, hr: | |
|---|---|
| up to degree 1 | 2 |
| up to degree 3 | 6 |
| relative hardness in conventional units | 0.4 |
| bending strength of the coating, mm | 10 |
| impact strength of the coating, kg . cm | 45 |
| adhesion to the steel plate, points | 2 |
| settling, vol. % | no residue |
| water resistance | 24 hr without any changes |

The above data prove the exemplified modification of the process to allow the polymerization time to be cut 7-fold as compared with the prior art process (see USSR Inventor's Certificate No. 138,377).

While the invention has been described herein in terms of the specific Examples, which are to be taken as preferred, numerous variations and modifications may be made in the invention without departing from the spirit and scope thereof as set forth in the appended claims.

What is claimed is:

1. A process for preparing polymeric petroleum resins, comprising:
  (a) polymerizing fractions of liquid pyrolzates of petroleum hydrocarbons, said fractions having boiling point of 10° to 190° C., including heating a reaction mixture of (1) said fractions and (2) a polymerization initiator in an amount of 0.2 to 2.0% by weight of the reaction mixture, which initiator comprises at least one organic peroxide compound and at least one metal salt of an organic carboxylic acid in a weight ratio of the organic peroxide compound to the metal salt of an organic acid of 1:1 to 19:1, said metal salt comprising at least one metal selected from the group consisting of an alkali metal, an alkali-earth metal, and a metal with more than one oxidation state; and
  (b) subsequently separating and recovering a polymeric petroleum resin end product.

2. A process as defined in claim 1, wherein the initiator used in polymerization further contains a mixture of an alkali metal salt and a salt of a metal with more than one oxidation state.

3. The process of claim 1, wherein said organic carboxylic acid is a fatty acid.

4. The process of claim 1, wherein said organic carboxylic acid is an aromatic acid.

5. The process of claim 1, wherein said organic acid is an unsaturated acid.

6. A process as defined in claim 1, wherein said organic carboxylic acid is naphthenic acid.

7. A process defined in claims 1, 3, 4 or 5 wherein a mixture of fractions having boiling point of 20° to 65° C. and fractions having boiling point of 130° to 190° C. is used as said liquid pyrolzyates of petroleum hydrocarbons.

8. A process as defined in claim 7, wherein the weight ratio is 1:1 to 5:1 used in the polymerization of said mixture of fractions.

9. A process as defined in claims 1, 3, 4 or 5 wherein fractions having boiling point of 130° to 190° C. are used as said liquid pyrolyzates of petroleum hyrdocarbons.

10. A process as defined in claim 9, wherein the weight ratio is 10:1 to 19:1 used in the polymerization of fractions having boiling point of 130° to 190° C.

* * * * *